United States Patent [19]

Adatto et al.

[11] Patent Number: 4,587,591
[45] Date of Patent: May 6, 1986

[54] POWER SUPPLY FOR OZONE GENERATOR

[75] Inventors: Maurice Adatto, Paris; Christian Coste, Versailles, both of France

[73] Assignee: Degremont, Hauts de Seine, France

[21] Appl. No.: 647,826

[22] Filed: Sep. 5, 1984

[30] Foreign Application Priority Data

Sep. 23, 1983 [FR] France ............... 83 15139

[51] Int. Cl.⁴ ........................................... C01B 13/10
[52] U.S. Cl. .................... 361/235; 204/176; 315/311
[58] Field of Search ............. 361/204, 235, 230, 231; 315/289, 311; 204/176

[56] References Cited

U.S. PATENT DOCUMENTS

| 2,060,842 | 11/1936 | Yaglou | 361/231 |
| 2,458,277 | 1/1949 | Lark et al. | 315/311 X |
| 2,857,501 | 10/1958 | Nitsche . | |
| 2,885,598 | 5/1959 | Burski | 315/311 X |
| 3,383,554 | 5/1968 | Oglesbee | 315/311 X |
| 3,833,492 | 9/1974 | Bollyky | 204/176 |

FOREIGN PATENT DOCUMENTS

| 1188228 | 3/1965 | Fed. Rep. of Germany . | |
| 1300524 | 8/1969 | Fed. Rep. of Germany . | |
| 2456455 | 12/1980 | France . | |
| 606906 | 8/1948 | United Kingdom | 204/176 |
| 613866 | 12/1948 | United Kingdom . | |

Primary Examiner—Harry E. Moose, Jr.
Attorney, Agent, or Firm—Wenderoth, Lind & Ponack

[57] ABSTRACT

A power supply for an ozone generator utilizes a magnetic-leakage type step-up transformer in series with a saturable core inductor which are connected in series across a low voltage AC source. The secondary of the transformer is connected to the ozone generator and the inductor has a control winding which is connected to a continuous (i.e. DC) current source whose value controls the inductance of the inductor. Since the voltage of the low voltage AC source is divided between the inductor and the transformer, the DC current effectively controls the magnitude of the voltage across the transformer primary and thereby controls the high AC voltage supplied to the ozone generator.

1 Claim, 2 Drawing Figures

POWER SUPPLY FOR OZONE GENERATOR

BACKGROUND OF THE INVENTION

The present invention relates to a power supply for an ozone generator and more particularly, to a power supply which is applicable to generators using tubular electrodes.

Industrial generators of this type are usually composed of a set of elementary generators connected in parallel within the same enclosure, each generator comprising two conducting electrodes separated by a narrow gap through which gas is passed and a dielectric material, usually glass.

These electrodes are concentric. Inside an outer metal electrode, around which cooling water circulates, a glass tube is placed. The tube is closed at one end and metallized internally, said metallization constituting the second electrode. A 2-3 mm discharge gap is provided between the glass tube and the metal tube through which is passed either pure oxygen or a gaseous mixture, such as atmospheric air containing oxygen.

Between these two electrodes, a growing alternating potential difference is applied and from a specified value of the voltage across the terminals of the generator corresponding to the breakdown voltage of the gas there appears in the discharge gap a violet corona, resulting in the partial conversion of oxygen into ozone.

The ozone production by such a generator is a growing function of the electrical power applied thereto and the control of this production at the required value is therefore effected by adjusting said power. This adjustment is effected by modifying the value of the primary voltage of the transformer so as to obtain in the secondary a voltage applied to the generator varying between 6 and 8 kV, the value of the breakdown voltage is around 18 kV at 50 Hz. This voltage is usually varied by means of an autotransformer having sliding contacts and placed in the primary circuit of the transformer. The power applied to an elementary generator can thus be varied, for example, between 0 and 400 watts, by moving the sliding contacts of the autotransformer.

From the electrical point of view, an ozone generator is a capacitive load, its power factor being on the order of 0.5, and to provide 400 watts of power, an apparent power of approximately 800 voltamperes must therefore be applied. For large-production apparatus consisting of a large number of generators in parallel, this apparent power can attain several hundreds of kVA, on the order of 500 kVA for a 600 generator apparatus. To prevent a high reactive power from being reflected to the low-voltage supply network of the transformer of the generator, an inductor designed to compensate for the capacitive charge of the generator is usually provided in the primary of this transformer according to the following equation (C stands for the capacitance of the generator, L the value of the inductance, f the frequency of the alternating current):

$$(2\pi f)^2 LC = 1$$

The presence of this inductor also enables one to limit the value of the current in the event of a short circuit in the ozone generator. In this case, in the absence of an inductor, the value of the current is only limited by the ideal impedance of the transformer and can thus attain more than twenty times its normal value, causing considerable damage to the generator. In the event of a short circuit, the voltage drop caused by the inductor automatically limits the current to an acceptable value.

However, this prior art power supply for an ozone generator has a number of drawbacks. In fact, it makes use of several electromagnetic elements having a considerable weight and occupying a great deal of space. In particular, the transformer must be designed not for the active power consumed by the generator, but for the required apparent power. Thus, it is necessary to use an autotransformer with complex mechanical control elements and without a high degree of operating reliability. It is also relatively expensive.

SUMMARY OF THE INVENTION

The present invention overcomes these disadvantages by providing the power supply for an ozone generator with a level controlled by means of a limited number of electromagnetic elements occupying a modest space, while enhancing the operating reliability and safety of the installation and by significantly reducing its price.

The present invention relates to a power supply for an ozone generator subjected to a high alternating voltage derived from the low-voltage electric distribution network by means of a step-up voltage transformer, characterized in that the transformer is of the magnetic-leakage type, said primary of the transformer being connected in series with an inductor having a saturable magnetic core.

It is known that the presence of an inductor in the power supply circuit of an ozone generator, designed to bring back the power of the system to a value close to unity, causes an over-voltage such that the voltage to which the primary of the transformer is subjected is higher than that of the network and which varies with the value of the inductance. Thus, it has been contemplated to vary this voltage, and thereby the power brought into play, by substituting an inductor with variable saturation, whose value can be modified in a known manner, for the control autotransformer, the serial transformer, and the fixed inductor, by modifying the magnetic characteristics of its core in order to increase or to reduce the overvoltage generated thereby.

However, it has been shown that it was not possible to vary the power in this manner by more than 20%, while it was desirable to be able to vary it in a ratio of at least 1 to 10. Furthermore, it has been found that the value of the voltage across the terminals of the transformer was not increasing uniformly with that of the inductor, the curve representing the value of the voltge as a function of that of the inductance having the form of a bell shaped curve.

According to the present invention, the conventional power supply transformer for the ozone generator has been replaced by a transformer known as a magnetic-leakage transformer whose air gap value corresponds to the creation across its terminals of a self-inductance that at least partially compensates for the capacitive effect of said generator and whose input power is then, on that account, brought back to a value substantially equal to the maximum active power necessary for powering this generator. Under these conditions, for a high value of the variable inductance there is generated across its terminals a voltage drop that is scalarly (i.e.—arithmetically) deducted from the voltage of the network, so that the voltage across the terminals of the primary of the power supply transformer of the generator assumes a lower value than that of the network. In proportion to the saturation of the magnetic core of the inductor, its impedance diminishes and thereby the voltage drop it creates and, if it has been appropriately selected, the voltage across the terminals of the transformer reaches a saturation voltage close to that of the network.

According to the present invention, the value of the inductance is controlled by varying the continuous (i.e.—direct) current generating a unidirectional magnetic flux that changes the degree of saturation of said inductance in order to modify the ozone production of the ozone generator by varying the value of its alternating supply voltage.

BRIEF DESCRIPTION OF THE DRAWINGS

The invention will be described with reference to the accompanying drawing.

DESCRIPTION OF THE PREFERRED EMBODIMENT

In the two cases, the ozone generator is depicted in the form of an elementary generator for simplicity, it being understood that an industrial generator is composed of a plurality of said elements connected electrically in parallel.

Figure 1:
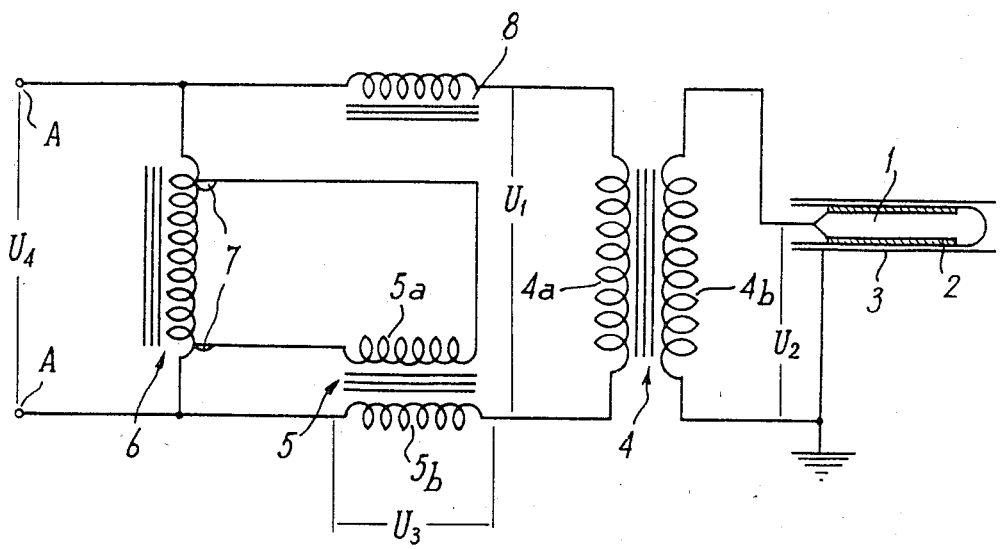
FIG. 1 shows schematically a conventional power supply for an ozone generator.

As shown in FIG. 1, corresponding to a conventional diagram, the ozone generator 1 is energized by applying a high alternating voltage $U_2$ between the inner metal portion of the glass tube 2 and the steel tube 3. This high voltage $U_2$ derived from the secondary 4b of a step-up transformer 4 must be fixed according to the production of ozone required, for example, between 8 and 18 kV, by varying the primary voltage $U_1$ applied to the primary 4a of said transformer. Said voltage $U_1$ is varied by a transformer 5, whose secondary 5b is connected in series in the primary circuit 4a of the transformer 4, and whose primary 5a is connected to an autotransformer 6 whose supply terminals are subjected to the input voltage $U_4$ across terminals A—A. The voltage $U_3$ generated in the secondary 5b of the transformer 5 is varied by modifying the position of the sliding contacts 7 of the autotransformer 6. This voltage is added vectorially to the input voltage $U_4$. Thus, a voltage $U_1$ is obtained in the primary 4a of the transformer 4 whose variation enables a power supply voltage $U_2$ of the ozone generator to be obtained in the secondary 4b, and which can be adjusted to any value within the specified range.

The primary circuit 4a of transformer 4 includes a series inductor 8 designed, on the one hand, to improve the power factor of the system and, on the other hand, to protect it against any short circuit that may occur in the generator.

Figure 2:
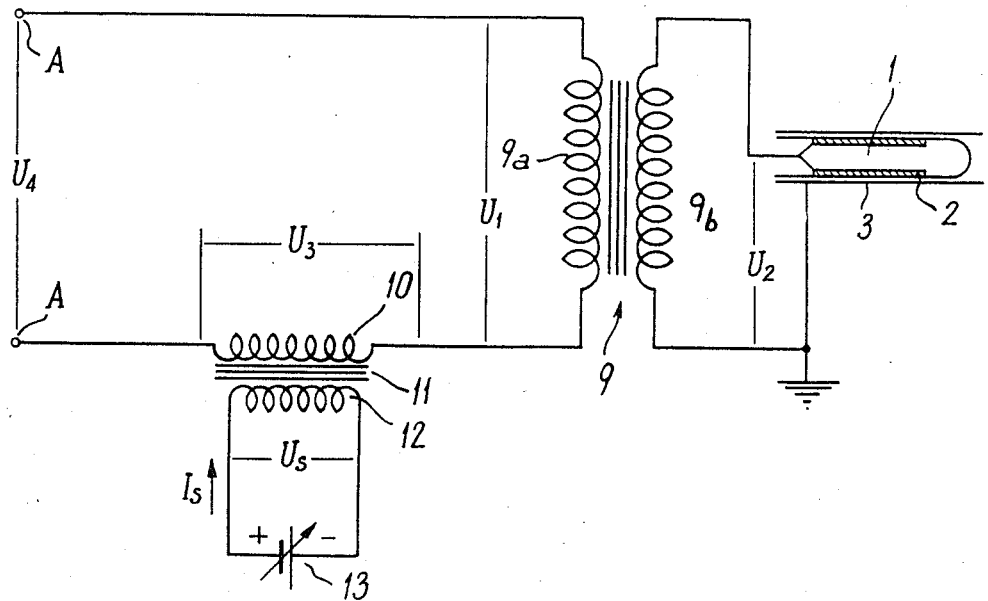
FIG. 2 shows schematically an apparatus incorporating the invention.

FIG. 2 corresponds to the power supply diagram of an ozone generator incorporating the present invention. One can appreciate the substantial simplification brought about by the invention by comparing it with the previous figure.

The high alternating voltage $U_2$ applied as described above to the ozone generator 1 is derived from the secondary 9b of a magnetic-leakage transformer 9 and is equal to the product of the voltage $U_1$ applied to the primary 9a multiplied by the transformation ratio. This voltage $U_1$ is the vectorial sum of the input voltage $U_4$ across terminals A—A and the voltage $U_3$ across the terminals of a variable inductor 10 connected in series in the circuit. This inductor is of the type having a magnetic core 11 whose reluctance can be varied by a special winding 12 through which flows a continuous (i.e.—direct) current having a controllable value $I_S$ supplied by a source 13 and generating in the core a unidirectional magnetic flux which is superimposed on the alternating flux produced by the winding through which flows the alternating current powering the transformer 9. Any increase in the value $I_S$ corresponds to a decrease in the value of the inductance of the inductor 10 and thereby of the voltage $U_3$ across its terminals, with a consequent increase of the voltages $U_1$ and $U_2$ at the terminals of the transformer 9 and thereby an increase in the power input to the generator 1, resulting in an increase in the ozone production.

Conversely, a decrease of this value $I_S$ generates a decrease of said power and thereby a decrease in the ozone production.

According to the present invention, a power supply for an ozone generator is provided comprising in the same enclosure a group of separate generators, e.g.—86 generators, connected in parallel. The installed capacity of the magnetic-leakage transformer was 40 kVA, instead of the 65 kVA normally required for a conventional transformer.

The table below shows the results achieved, the meaning of the symbols being as follows:

$U_4$—input voltage of the network
$U_S$—direct voltage in volts across the terminals of the saturation winding of the inductor
$I_s$—direct saturation current of the inductor in amperes
$U_1$—primary voltage of the power supply transformer of the ozone generator in volts
$U_2$—secondary voltage of the transformer in kV
W—power consumed by the generator, in kW
P—ozone production in grams/hour

| $U_4$ | $U_s$ | $I_s$ | $U_1$ | $U_2$ | W | P |
|-----|-----|-----|-----|-----|----|------|
| 380 | 6    | 3    | 240 | 10.7 | 2  | 130  |
| 380 | 6.8  | 3.3  | 260 | 11.6 | 5  | 360  |
| 380 | 8    | 3.9  | 290 | 12.9 | 10 | 750  |
| 380 | 10   | 4.8  | 310 | 13.8 | 15 | 1,100 |
| 380 | 12   | 6    | 330 | 14.7 | 20 | 1,430 |
| 380 | 17.8 | 9.4  | 360 | 16.1 | 25 | 1,630 |
| 380 | 21.2 | 11.2 | 375 | 16.7 | 28 | 1,700 |

The apparatus incorporating the invention, which is distinguished by its simplicity and operating reliability because it consists of purely static elements requiring no maintenance whatsoever, enables power to be supplied in these these highly advantageous and economic conditions, which power can reach several hundred of kilowatts.

In the embodiment discussed herein, the installation of this apparatus of the invention has enabled savings of up to 40% of the cost of the power supply for the ozone generator.

We claim:

1. A power supply for supplying a high AC voltage to an ozone generator from a low voltage AC source, said supply comprising:

a magnetic-leakage type transformer and a saturable core inductor, said transformer having a primary winding which is connected in series with a first winding of said inductor and the series combination connected to said low voltage AC source, a secondary winding of said transformer being connected to said ozone generator;

said inductor having a second winding which is supplied with a continuous DC current so as to control the inductance value of said inductor by varying the amount of saturation of said saturable core of said inductor;

wherein the magnitude of said high AC voltage supplied to said ozone generator is varied in accordance with the magnitude of said continuous DC current.

* * * * *